US005678193A

United States Patent [19]

Helm et al.

[11] Patent Number: 5,678,193

[45] Date of Patent: Oct. 14, 1997

[54] DETERMINATION OF AN INITIAL LAUNCH TIME IN A SIMULCAST COMMUNICATION SYSTEM

[75] Inventors: David P. Helm, Glendale Heights; Mario F. Derango, Lake Zurich, both of Ill.

[73] Assignee: Motorola, Inc., Schaumburg, Ill.

[21] Appl. No.: 608,860

[22] Filed: Feb. 29, 1996

[51] Int. Cl.[6] .......... H04B 1/00

[52] U.S. Cl. .......... 455/51.2; 455/56.1; 455/67.6

[58] Field of Search .......... 455/51.2, 51.1, 455/67.6, 67.4, 33.1, 53.1, 54.1, 56.1, 116, 127; 375/356, 357, 359; 370/508, 519, 324

[56] References Cited

U.S. PATENT DOCUMENTS

| | | | |
|---|---|---|---|
| 4,506,384 | 3/1985 | Lucas | 455/51.2 |
| 5,483,671 | 1/1996 | Helm et al. | 455/51.1 |
| 5,485,632 | 1/1996 | Ng et al. | 455/51.2 |
| 5,530,915 | 6/1996 | Shaughnessy et al. | 455/51.2 |

*Primary Examiner*—Reinhard J. Eisenzopf
*Assistant Examiner*—Lester G. Kincaid
*Attorney, Agent, or Firm*—Christopher P. Moreno

[57] ABSTRACT

A simulcast controller 201 receives a communication request at a current time. A preliminary launch time equivalent to the sum of the current time plus a predetermined offset value (401) is calculated along with a difference between the preliminary launch time and a transmission conclusion time (402). When the difference is not greater than a sum of a predetermined dekey interval (404) and a predetermined keyup interval (408), a supplemental offset value (406–407) is added to the preliminary launch time to produce the initial launch time. Alternatively, upon termination of a previous communication (600), a period of time equivalent to the sum of the predetermined dekey interval (602) and the predetermined keyup interval (603) is initiated. If the current time is earlier than an expiration time (604), the predetermined offset value (601) and the supplemental offset value (606–607) are added to the current time to produce the initial launch time.

9 Claims, 3 Drawing Sheets

—PRIOR ART—

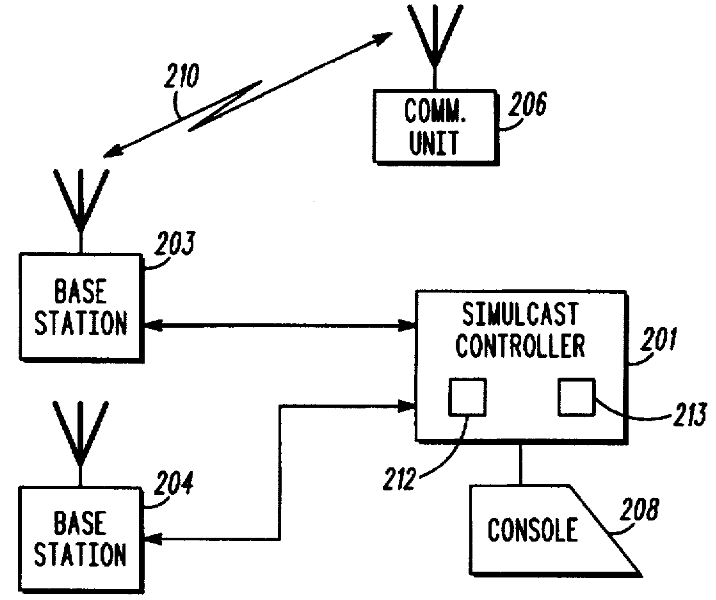
200
FIG.2
FIG.3
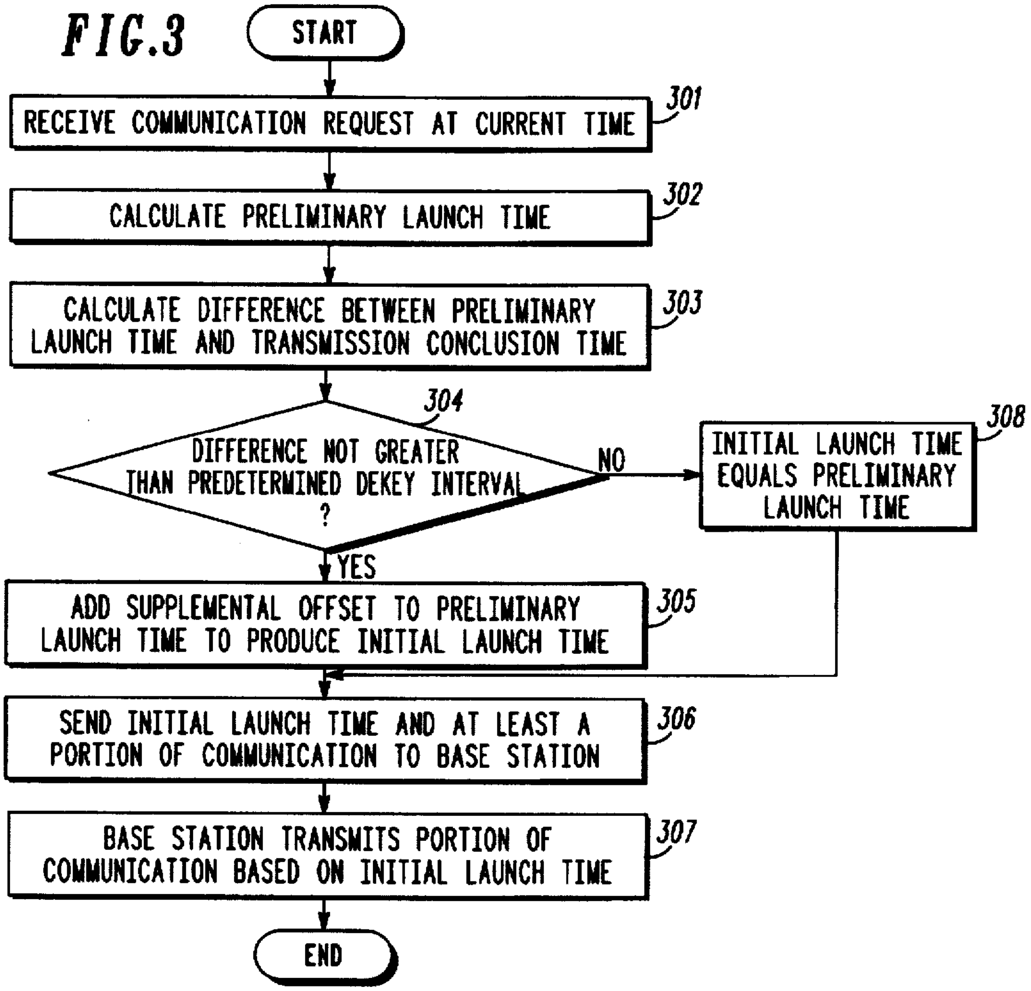

DETERMINATION OF AN INITIAL LAUNCH TIME IN A SIMULCAST COMMUNICATION SYSTEM

TECHNICAL FIELD OF THE INVENTION

The present invention relates generally to simulcast systems and, in particular, to methods for determining an initial launch time and use thereof in the transmission of a simulcast communication.

BACKGROUND OF THE INVENTION

Wireless simulcast communication systems are generally known in the art. In such systems, a minimum number of fixed transmitters, typically distributed throughout a large geographic region, are synchronized under the control of a central simulcast controller (e.g., a comparator) to provide the most uniform radio frequency (RF) coverage area possible. By synchronizing transmission of a message over multiple transmitters, destructive interference is minimized, thereby resulting in the uniform coverage area.

The quality of communications within such a coverage area is affected by, among other things, the existence of differential delays between the multiple transmitters. When the differential delays are substantially zero, the multiple RF signals constructively interfere with each other thereby providing good audio reception within the coverage area. Significant differential delays can cause the multiple signals to destructively interfere with each other, thus reducing the quality of received signals.

To minimize the occurrence of non-zero differential delays between transmitters, current simulcast systems use initial launch times to synchronize transmissions. Initial launch times are calculated by a simulcast controller relative to an absolute time reference available to the simulcast controller and each transmitter in the system. When the initial launch time occurs relative to the absolute time reference, each transmitter initiates transmission of the message, thereby minimizing any differential delays. The determination of an initial launch time must take into account existence of various delays inherent throughout the simulcast system. For instance, current simulcast controllers, when determining an initial launch time for a given communication, take into account the minimum amount of time required for a transmitter (typically, a base station) to "keyup", i.e., the amount of time required before a base station can actually transmit a signal after having received a command to commence transmitting.

However, current simulcast systems do not take into account the amount of time required for a transmitter to achieve a "dekey" condition, i.e., after reception of a command to cease transmitting (a dekey command), the minimum amount of time required before another transmission can be reliably started. FIG. 1 illustrates a dekey interval 104 after the reception of a dekey command 101. Additionally, a keyup interval 105 is shown after the reception of a keyup command 102. The initial launch time 103 following the keyup command 102 cannot occurring prior to expiration of the keyup interval. A typical value for a keyup interval is 15 ms. and a typical value for a dekey interval is 10 ms. So long as there is an intermediate interval 106 greater than the sum of the dekey interval 104 and the keyup interval 105 between successive messages, current communication systems are not required to explicitly account for the dekey interval when computing initial launch times.

However, many simulcast systems provide the ability to queue messages such that, following the end of transmission of a previous message, a subsequent message is available for simulcast transmission within milliseconds. Thus, it is quite possible that the interval between messages will be less than the sum of the dekey and keyup intervals. Without taking into account the dekey interval, an initial launch time for a subsequent message could fall within the keyup interval (or in drastic cases, within the dekey interval). When this happens, any information presumed transmitted prior to expiration of the keyup interval (or the dekey and keyup intervals) will, in reality, be truncated. Considering that the amount of truncated audio can be on the order of the amount of time it takes to transmit a verbal "yes" or "no" response, the potential for negative consequences (particularly in the area of public safety communication systems) is readily apparent.

One possible solution to this problem is to always delay transmission of new messages such that the dekey interval is allowed to expire prior to transmission. However, this solution is generally not acceptable; the addition of fixed delays to a communication system is prohibitive because of an increase in average transmission delay. Therefore, a need exists for a method of determining an initial launch time that takes dekey intervals into account without requiring the addition of a fixed delay to all communications.

BRIEF DESCRIPTION OF THE DRAWINGS

FIG. 2 is a block diagram of a wireless simulcast communication system in accordance with the present invention.

FIG. 3 is a flowchart illustrating a first embodiment in accordance with the present invention.

DETAILED DESCRIPTION OF A PREFERRED EMBODIMENT

Figure 1:
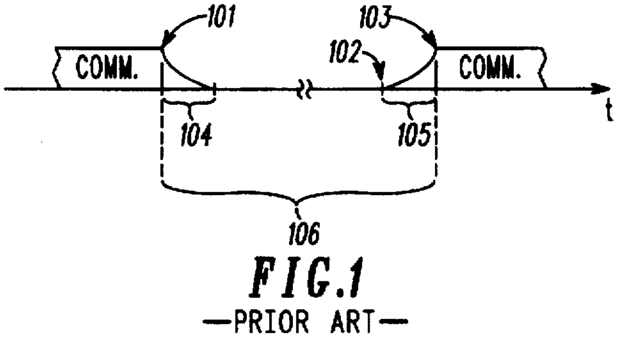
FIG. 1 illustrates exemplary transmissions of simulcast communications in accordance with the prior art.

Generally, the present invention provides a method for determining an initial launch time in simulcast communication systems. In a first embodiment, a simulcast controller receives a communication request at a current time relative to an absolute time reference. Responsive to the communication request, the controller calculates a preliminary launch time as the sum of the current time plus a predetermined offset value. A difference between the preliminary launch time and a transmission conclusion time, corresponding to a previous communication, is also calculated. When the difference is not greater than a sum of a predetermined dekey interval and a predetermined keyup interval, a supplemental offset value is added to the preliminary launch time to produce the initial launch time.

In a second embodiment, the simulcast controller, upon termination of the previous communication, initiates a period of time equivalent to a sum of the predetermined dekey interval and the predetermined keyup interval. When the communication request is received at the current time, the controller determines if the current time is earlier than an expiration time corresponding to the period of time. If so, the predetermined offset value and the supplemental offset value are added to the current time to produce the initial launch time. Once determined, regardless of the embodiment used, the initial launch time can be sent to one or more base stations, along with at least a portion of the communication to be transmitted.

Using either embodiment, the present invention incorporates the time required for transmitters to dekey into the determination of initial launch times. This is done without adding a fixed delay in all cases, thereby substantially eliminating the possibility of truncated communications, while simultaneously minimizing any increase in average message transmission delay.

The present invention can be more readily described with reference to FIGS. 2–6. FIG. 2 is a block diagram of a wireless simulcast communication system 200 that includes a simulcast controller 201, base stations 203–204, a plurality of communication units 206 (only one shown), and a console 208. The simulcast controller 201 may comprise an AstroTAC comparator, manufactured by Motorola Inc., connected to a Global Positioning Satellite (GPS) receiver for absolute timing information. The simulcast controller 201 includes a processor 212 and memory 213 used in the calculation of initial launch times. The processor 212 may comprise one or more microprocessors, as known in the art, and the memory 213 may comprise read-only memory (ROM) or random-access memory (RAM) or a combination thereof. Although not shown, both the base stations 203–204 and the communication units 206 include processors and memories similar in function to those included in the simulcast controller 201.

Suitable base stations 203–204 are QUANTAR or QUANTRO base stations by Motorola, Inc., capable of transmitting and receiving communications via an RF communication resource 210. Each base station 203–204 is connected to a local GPS receiver to provide the required absolute time reference. Each base station 203–204 is capable of receiving portions of a communication (such as packets of voice or data) from the simulcast controller 201 and transmitting the portions, via the RF resource 210, based on an initial launch time included with the portions.

The communications units 206 may be hand-held portable or in-car mobile radios that are capable of receiving and transmitting RF signals. The console 208 comprises an operator postion and an interace unit, as known in the art, when the simulcast controller 201 is an AstroTAC comparator. Both the communication units 206 and the console 208 can send communication requests to the simulcast controller 201.

While FIG. 2 illustrates the simulcast communication system 200 utilizing a specific network configuration, the system 200 may be configured as a star configuration, a ring configuration or any other configuration, provided that the simulcast controller 201 has communication paths capable of carrying voice and/or data information to each of the base stations 203–204. Furthermore, the physical communication links between the simulcast controller 201 and the base stations 203–204 may be modems utilizing public telephone lines, dedicated leased digital lines, microwave point-to-point links, fiber optic links, packet network links, or combinations thereof. The present invention is applicable to wireless simulcast systems regardless of the system configuration and the manner in which it is implemented.

FIG. 3 is a flowchart illustrating a first embodiment in accordance with the present invention. The steps illustrated in FIG. 3 can be implemented using the processors and memories resident in both the simulcast controller 201 and each base station 203–204. At step 301, the simulcast controller receives a communication request at a current time relative to the absolute time reference. The communication request originates from either a communication unit (received by a base station and forwarded to the controller) or a console (sent directly to the controller). In practice, the absolute time reference is a highly stable and periodic timing signal that is universally available to simulcast controller 201 and base stations 203–204, such as a GPS timing signal.

At step 302, responsive to receiving the communication request, the simulcast controller calculates a preliminary launch time by adding a predefined offset value to the current time (as determined in step 301). The predefined offset value is intended to account for worst-case keyup intervals (e.g., the longest time needed for any base station in the system to establish transmission capability) and any link and processing delays between the simulcast controller and the base stations. For example, link delays are typically on the order of 0–200 ms., whereas processing delays (i.e., delays inherent to the operation of the infrastructure equipment) are typically on the order of 10–100 ms. In practice, the predefined offset value is entered by an administrator of the simulcast communication system when the system is first assembled and/or periodically during use of the system.

At step 303, the simulcast controller calculates a difference between the preliminary launch time and a transmission conclusion time corresponding to a previous communication. A transmission conclusion time is calculated by the simulcast controller for each message to be transmitted. As discussed in greater detail below, the transmission conclusion time corresponds to that time, relative to the absolute time reference, at which the final portion of the most recently transmitted message is to be actually transmitted by the base stations. In practice, the transmission conclusion time is equivalent to the time at which the simulcast controller sends the last portion of a message to the base stations plus the predetermined offset value, discussed above.

At step 304, the difference between the preliminary launch time and the transmission conclusion time is compared against a sum of a predetermined dekey interval and a predetermined keyup interval. The predetermined dekey interval is a fixed value representing the most time it would take a base station to achieve a dekey condition. The predetermined keyup interval is a fixed value representing the most time it would take a base station to keyup. If the difference calculated at step 303 is greater than the sum of the predetermined dekey interval and the predetermined keyup interval, then the initial launch time is set equivalent to the preliminary launch time at step 808. In effect, step 308 occurs when the communication request is received by the simulcast controller such that there is a sufficiently large intermediate interval between messages to account for the predetermined dekey interval, the predetermined keyup interval, and any system delays (as represented by the predetermined offset value).

If, however, the difference is not greater than the sum of the predetermined dekey interval and the predetermined keyup interval, then the initial launch time is set equivalent to the sum of the preliminary launch time plus a supplemental offset value at step 305. Stated another way, the supplemental offset value is added to the preliminary launch time when it is determined that the communication request was received too close, in time, to the end of the previous communication. The addition of the supplemental offset value to the preliminary launch time effectively pushes the initial launch time far out enough into the future to account for dekey and keyup intervals. As discussed in greater detail below, the present invention contemplates using a supplemental value less than or equal to the sum of the predetermined dekey interval and the predetermined keyup interval in order to minimize any added delays.

At step 306, regardless of whether the initial launch time was calculated at step 305 or step 308, the simulcast controller sends the initial launch time and at least a portion of the communication corresponding to the communication request to at least one base station. In the preferred embodiment, the communication is formed of packets. Thus, a portion of a communication can comprise an integer number of packets. The actual communication is originated by either a communication unit (received by a base station and forwarded to the controller) or a console (sent directly to the controller). At step 307, the at least one base station transmits the portion beginning at the initial launch time relative to the absolute time reference. As known in the art, subsequent portions of the communication will include launch times based on the initial launch time. Because the initial launch time calculated in accordance with the above-described first embodiment only accounts for the sum of the predetermined dekey interval and the predetermined keyup interval when necessary, the possibility of truncated communications is substantially eliminated without unnecessarily adding a fixed delay to all communications.

Figure 4:
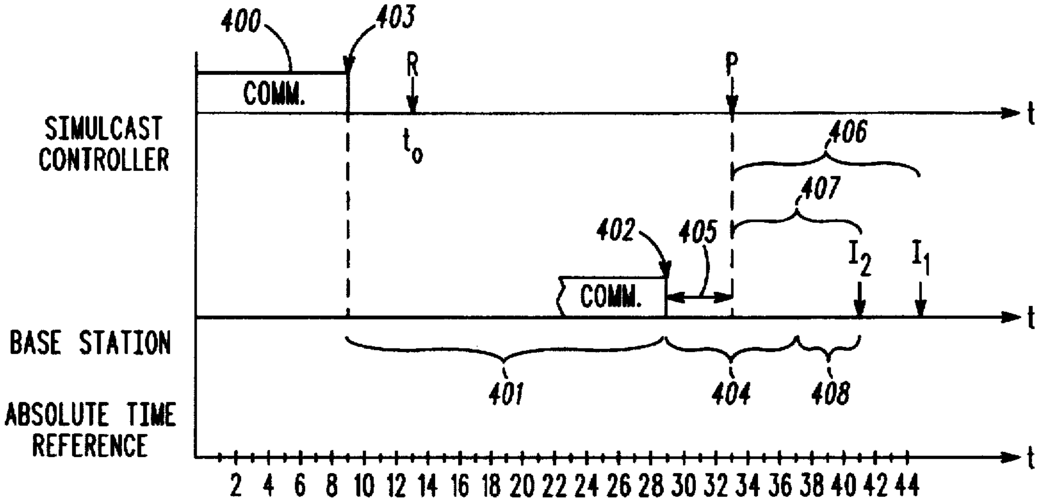
FIG. 4 illustrates exemplary transmission of simulcast communications in accordance with the first embodiment of FIG. 3.

Reference is made to FIG. 4 to better illustrate the first embodiment described above. In particular, FIG. 4 illustrates an exemplary transmission of simulcast communications in accordance with the first embodiment of FIG. 3. Time lines for both a simulcast controller and at least one base station are shown relative to an absolute time reference. The incremental units shown along the absolute time reference scale are for illustrative purposes only; in practice, any of a number of incremental measurements of time can be used as a matter of design choice.

As shown, a communication request (R) is received by the simulcast controller at a current time ($t_0$). The preliminary launch time (P) is calculated by adding the predetermined offset 401 to the current time, $t_0$. In this example, the predetermined offset value 401 is equivalent to twenty incremental time units. A difference 405 between the preliminary launch time and a transmission conclusion time 402 is calculated.

As mentioned above, the transmission conclusion time corresponds to that time, relative to the absolute time reference, at which the final portion 403 of a most recently transmitted message 400 is to be actually transmitted by the base station(s). Thus, relative to the simulcast controller, the transmission conclusion time is a point of time in the future at which the base station(s) will cease transmission.

As shown, the difference 405 is not greater than the sum of the predetermined dekey interval 404 and the predetermined keyup interval 408. In this example, the predetermined dekey interval 404 is equivalent to eight incremental time units and the predetermined keyup interval 408 is equivalent to four incremental time units. Thus, the time it takes all base stations in the system to achieve a dekey condition is no more than eight incremental time units and the time to achieve transmission capability is four incremental time units. If the difference were greater than the sum of the predetermined dekey interval 404 and the predetermined keyup interval 408, the preliminary launch time would necessarily be sufficiently distant in time from the transmission conclusion time 402 such that the preliminary launch time could be used as the initial launch time.

Given that the difference 405 is not greater than the sum of the predetermined dekey interval 404 and the predetermined keyup interval 408, a supplemental offset value is added to the preliminary launch time to produce the initial launch time. Two embodiments corresponding to the value of the supplemental offset value are shown in FIG. 4. The first supplemental offset value 406 is equivalent to the sum of the predetermined dekey interval 404 and the predetermined keyup interval 408; when added to the preliminary launch time, the initial launch time labeled $I_1$ results.

The second supplemental offset value 407 is equivalent to the interval that results when the preliminary launch time is subtracted from the sum of the transmission conclusion time 402, the predetermined dekey interval 404, and the predetermined keyup interval 408, as shown. When added to the preliminary launch time, the second supplemental offset value results in the initial launch time labeled $I_2$. In essence, the second supplemental offset value 407 is that interval minimally required for the initial launch time to accommodate the predetermined dekey interval 404 and the predetermined keyup interval 408. Regardless of whether the first supplemental offset 406 or the second supplemental offset 407 is used, the resulting initial offset will allow for the expiration of the predetermined dekey interval 404 and the predetermined keyup interval 408, thereby preventing truncation.

Figure 5:
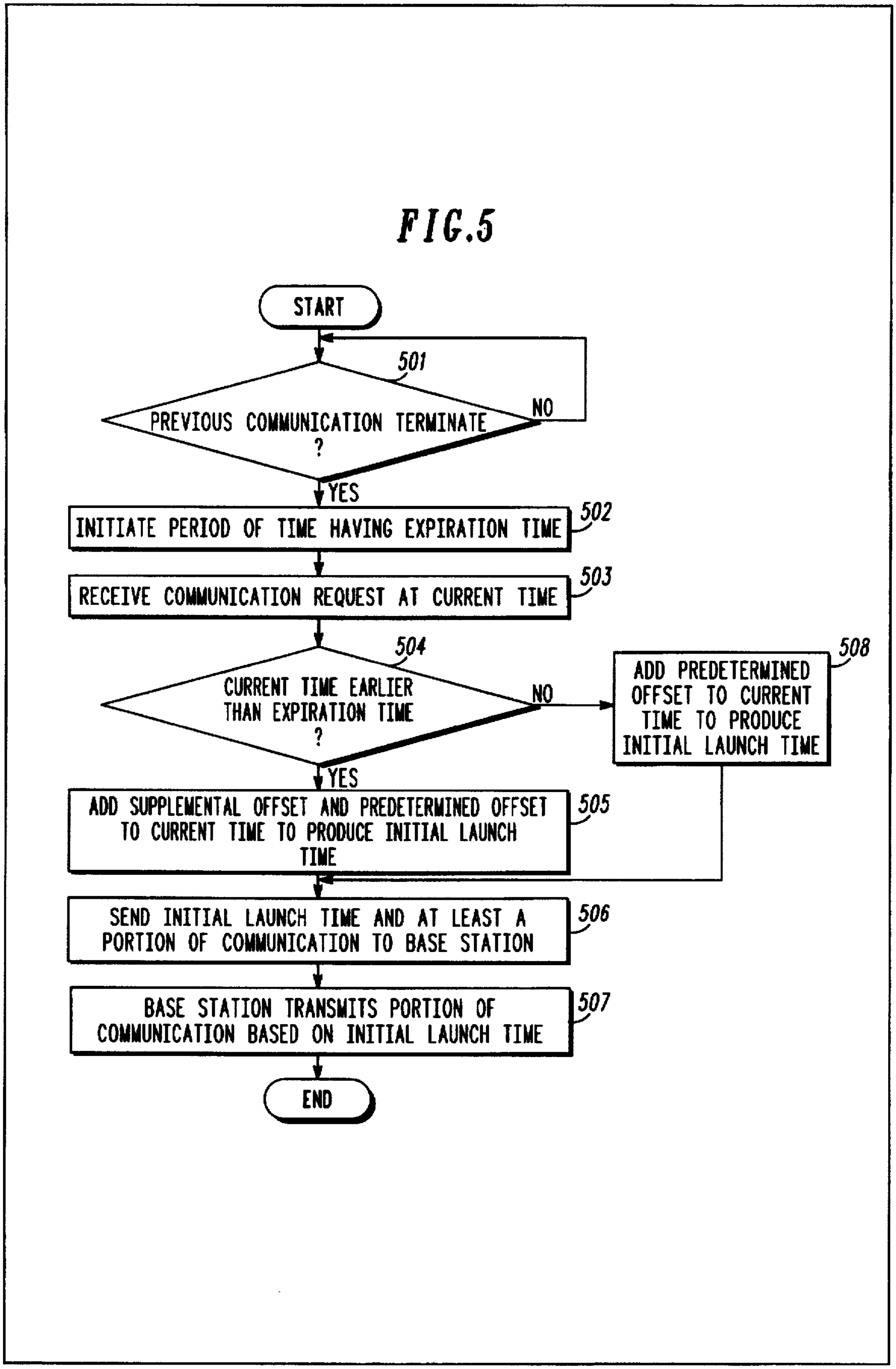
FIG. 5 is a flowchart illustrating a second embodiment in accordance with the present invention.

FIG. 5 is a flowchart illustrating a second embodiment in accordance with the present invention. The steps illustrated in FIG. 5 can be implemented using the processors and memories resident in both the simulcast controller 201 and each base station 203–204. At step 501, the simulcast controller detects when a previous communication terminates. Methods for detecting when a previous communication terminates are known in the art. Upon termination of the previous communication, the simulcast controller initiates, at step 502, a period of time equivalent to a sum of a predetermined dekey interval and a predeterermined keyup interval as measured by a timer. Because the period of time is of finite length, it has an expiration time, which expiration time is indicated in practice by the timer.

At step 503, the simulcast controller receives a communication request at a current time relative to an absolute time reference. The current time is necessarily subsequent to the initiation of the predetermined dekey interval. It is determined at step 504 whether the current time, corresponding to the reception of the communication request, is earlier than the expiration time for the period of time. Alternatively stated, it is determined whether the communication request was received prior to expiration of the timer. If not, a predetermined offset value, as discussed above, is added to the current time at step 508 to produce the initial launch time. Because the communication request has been received after the expiration of the period of time, the addition of the predetermined offset value to the current time is sufficient to account for any remaining dekey and keyup intervals and system delays.

If, at step 504, it is determined that the current time is earlier than the expiration time for the period of time, the predetermined offset value and a supplemental offset value is added to the current time at step 505 to produce the initial launch time. As discussed above, the supplemental offset value is added to account for the communication request having been received prior to the expiration of the period of time.

Remaining steps 506 and 507 are functionally equivalent to step 306 and 307 discussed above. The second embodiment of the present invention, although implemented differently, offers the equivalent benefits as the first embodiment; because the calculation of the initial launch time only accounts for the sum of the predetermined dekey interval and the predetermined keyup interval when necessary, the possibility of truncated communications is substantially eliminated without unnecessarily adding a fixed delay to all communications.

Figure 6:
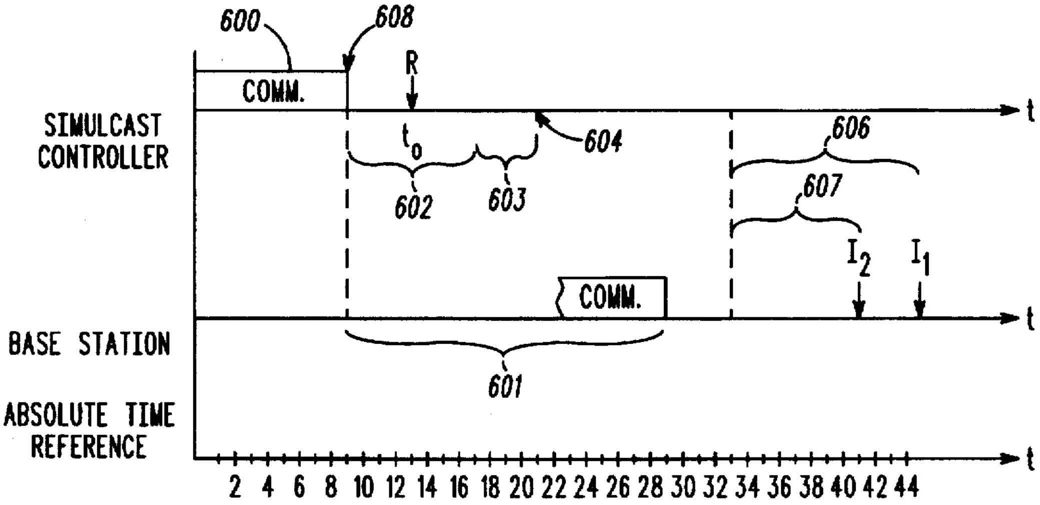
FIG. 6 illustrates exemplary transmission of simulcast communications in accordance with the second embodiment of FIG. 5.

Reference is made to FIG. 6 to better illustrate the second embodiment described above. In particular, FIG. 6 illustrates and exemplary transmission of simulcast communications in accordance with the second embodiment of FIG. 5. Time lines for both a simulcast controller and at least one base station are shown relative to an absolute time reference. The incremental units shown along the absolute time reference scale are for illustrative purposes only; in practice, any of a number of incremental measurements of time can be used as a matter of design choice.

As shown, a period of time equivalent to a sum of a predetermined dekey interval 602 and a predetermined keyup interval 603 is initiated by a simulcast controller upon termination 608 of a previous communication 600. The previous communication 600 is shown not in its entirety for the sake of illustration. In the example, a communication request (R) is received by the simulcast controller at a current time ($t_0$), which current time is earlier than an expiration time 604 for the period of time. If the communication request were received after the expiration 604 of the period of time, there would be no need to account for base station dekey and keyup intervals. However, because the communication request is received prior to the expiration 604 of the period of time, the predetermined offset value 601 and a supplemental offset value are added to the current time to produce the initial launch time.

As with the first embodiment described in FIGS. 3 and 4, two embodiments corresponding to the value of the supplemental offset value are shown in FIG. 6. The first supplemental offset value 606 is equivalent to the sum of the predetermined dekey interval 602 and the predetermined keyup interval 603, which, when added with the predetermined offset value to the current time, results in the initial launch time labeled $I_1$.

The second supplemental offset value 607 is equivalent to the interval that results when the current time is subtracted from the expiration time 604. When added, along with the predetermined offset interval, to the current time, the second supplemental offset value 607 results in the initial launch time labeled $I_2$. As before, the second supplemental offset value 607 is that interval minimally required for the initial launch time to accommodate the predetermined dekey interval 602 and the predetermined keyup interval 603. Regardless of whether the first supplemental offset 606 or the second supplemental offset 607 is used, the resulting initial offset will allow for the expiration of the predetermined dekey interval 602 and the predetermined keyup interval 603, thereby preventing truncation.

The present invention provides a method for determining an initial launch time and use thereof in simulcast communication systems. The present invention incorporates into the determination of initial launch times, when necessary, the time required to accomodate for base station dekey and keyup intervals. In this manner, the possibility of truncated communications is substantially eliminated while simultaneously minimizing any increase in average transmission delay.

We claim:

1. In a simulcast controller, a method for determining an initial launch time, the method comprising steps of:

receiving a communication request at a current time;

responsive to the communication request, calculating a preliminary launch time comprising the current time plus a predefined offset value;

calculating a difference between the preliminary launch time and a transmission conclusion time corresponding to a previous communication; and adding a supplemental offset value to the preliminary launch time to produce the initial launch time when the difference is not greater than a sum of a predetermined dekey interval and a predetermined keyup interval.

2. The method of claim 1, further comprising the step of adding a supplemental offset value to the preliminary launch time, wherein the supplemental offset value is equivalent to the sum of the predetermined dekey interval and the predetermined keyup interval.

3. The method of claim 1, further comprising the step of adding a supplemental offset value to the preliminary launch time, wherein the supplemental offset value is equivalent to the transmission conclusion time, plus the sum of the predetermined dekey interval and the predetermined keyup interval, less the preliminary launch time.

4. In a simulcast controller, a method for determining an initial launch time, the method comprising steps of:

initiating a period of time equivalent to a sum of a predetermined dekey interval and a predetermined keyup interval upon termination of a previous communication, the period of time having an expiration time;

receiving a communication request a current time;

determining whether the current time is earlier than the expiration time; and adding a supplemental offset value and a predetermined offset value to the current time to produce the initial launch time when the current time value is earlier than the expiration time.

5. The method of claim 4, further comprising the step of adding the supplemental offset value and the predetermined offset value to the current time, wherein the supplemental offset value is equivalent to the sum of the predetermined dekey interval and the predetermined keyup interval.

6. The method of claim 4, further comprising the step of adding the supplemental offset value and the predetermined offset value to the current time, wherein the supplemental offset value is equivalent to the expiration time, less the current time.

7. In a simulcast communication system that includes at least one base station coupled to a comparator, a method for transmitting a simulcast communication, the method comprising the steps of:

at the comparator:

receiving, at a current time, a communication request corresponding to the simulcast communication;

responsive to the communication request, calculating, a preliminary launch time comprising the current time plus a predefined offset value;

calculating a difference between the preliminary launch time and a transmission conclusion time corresponding to a previous communication;

adding a supplemental offset value to the preliminary launch time to produce the initial launch time when the difference is not greater than a sum of a predetermined dekey interval and a predetermined keyup interval;

sending the initial launch time and at least a portion of the simulcast communication to the at least one base station; and at the at least one base station:

transmitting the at least a portion of the simulcast communication based on the initial launch time.

8. The method of claim 7, further comprising the step of adding a supplemental offset value to the preliminary launch time, wherein the supplemental offset value is equivalent to the sum of the predetermined dekey interval and the predetermined keyup interval.

9. The method of claim 7, further comprising the step of adding a supplemental offset value to the preliminary launch time, wherein the supplemental offset value is equivalent to the transmission conclusion time, plus the sum of the predetermined dekey interval and the predetermined keyup interval, less the preliminary launch time.

* * * * *